Patented Apr. 5, 1949

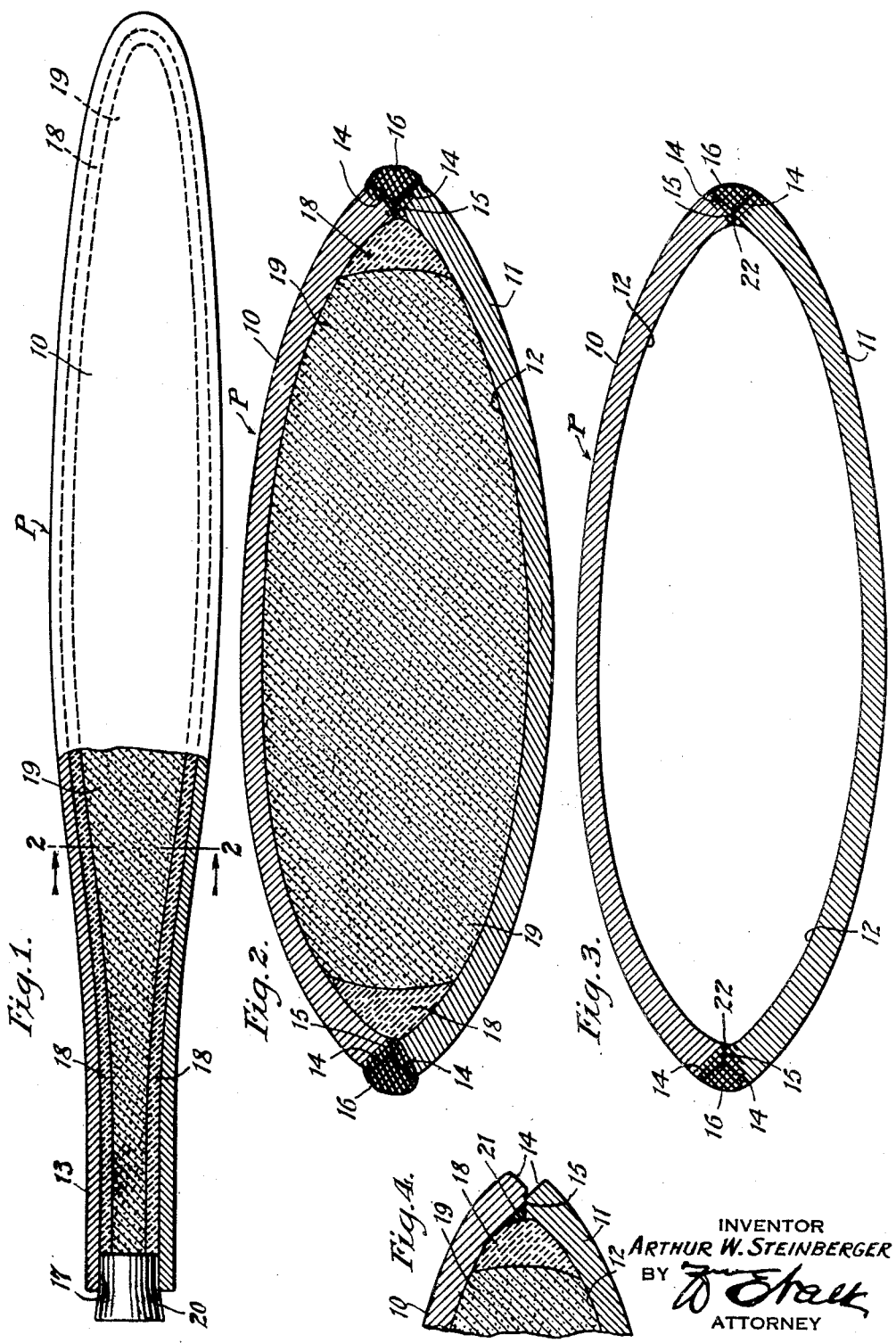

2,466,562

UNITED STATES PATENT OFFICE 2,466,562

ART OF WELDING, PLATE AND PROPELLER BLADE CONSTRUCTION

Arthur W. Steinberger, Elizabeth, N. J., assignor to Curtiss-Wright Corporation, a corporation of Delaware Application September 21, 1944, Serial No. 555,166

2 Claims. (Cl. 113—112)

1

This invention relates to the art of welding and, more particularly, to a novel arrangement for imparting a desired configuration to one side of a welded joint; the invention has further reference to a novel plate and propeller blade construction.

In accordance with the invention, a pair of plates are held in welding position whereupon paste-like material is disposed in engagement with said plates to form a backing which abuts the interior surfaces of said plates at and on both sides of a line defining a welded joint which is to secure said plates together, said paste-like material thereafter being heated to form a refractory backing.

In a broad aspect, the invention relates to two plates which are supported in welding position, the paste-like material being supported at the weld line on one side of said plate members and the welding operation performed on the opposite side of said plates; more particularly, the two plates aforesaid are disposed in facing relation so as to form an interior chamber, said plates constituting those of a hollow steel propeller blade and, preferably although not necessarily, said plates are duplicates and without twist so that the weld line is disposed in a single plane.

More particularly, the aforesaid plates form a propeller blade construction defining a chamber which is substantially closed except for a passage defined by the propeller blade shank, the paste-like material together with supporting granular material, or equivalent, being passed into said chamber by way of said passage.

The invention has particular reference to a welding operation performed on a hollow structure where complete weld penetration is required while maintaining the inside or back of the weld bead smooth and free from burned-through effects. When the hollow structure is of such character that the weld line is curved thereby preventing the use of a solid or rigid backing, it is a feature of the invention that the backing material is introduced into the hollow structure and deposited at the curved weld line while in a paste-like or viscous state, such backing material being subsequently hardened for the purpose desired.

An object of the invention is to provide a hollow propeller blade structure formed of plates disposed in facing relation whose interior is uniformly free of surface irregularities.

Another object of the invention is to provide a hollow propeller blade structure formed of plates disposed in facing relation wherein the internal weld seam presents an integral fillet of transverse parabolic contour blending with the inner surface of said plates.

A further object of the invention is to provide a welded propeller blade structure formed of plates disposed in facing relation which does not require additional copper brazing or welding along the joined surfaces interiorly of the blade to form a weld seam of uniform contour.

Another object of the invention is to provide a hollow propeller blade structure formed of plates disposed in facing relation wherein an integral, uniform, internal fillet is formed in the operation of joining said plates by an external welding operation.

Various other objects, advantages and features of the invention will become apparent from the following detailed description.

The invention resides in the art of attaching plates by a welded joint, the method of welding a propeller blade, the blade construction, combinations and refractory backing features of the character hereinafter described and claimed.

For an understanding of the invention and for an illustration of one form thereof, reference is to be had to the accompanying drawings in which:

Figure 1 is a plan view of a propeller blade structure partly in section illustrating the fillet-forming backing material therein;

Fig. 2 is a sectional view taken on the line 2—2 of Fig. 1;

Fig. 3 is a similar view illustrating the propeller blade after completion of the welding operation; and Fig. 4 is a fragmentary view in section illustrating a modified form of the invention.

Referring to the drawing for an example of one of the many plate arrangements which may be welded in accordance with the invention, P represents a twist-free propeller blade construction. As herein shown, the blade P is formed from two duplicate plates 10 and 11 disposed in facing relation and secured by welded joints at the leading and trailing edges thereof, said plates defining an interior chamber 12 which is adapted to be temporarily sealed in the manner and for the purpose hereinafter described. Each of the plates 10 and 11 includes a semi-cylindrical shank portion 13 merging into the plate proper which, generally, is of convex configuration and substantially symmetrical with respect to its longitudinal center line, the convexity decreasing in a progressive manner as the tip of each plate is approached, said plates being also tapered in a direction extending toward the tip thereof and having minimum thickness midway between the edges thereof along said center line, the plate thickness increasing at the respective edges of said plates.

As clearly shown in Figs. 2, 3 and 4, the marginal edge portion of each plate, preferably although not necessarily, is beveled at an angle as indicated at 14 and shaped to form a relatively narrow plane surface 15 whereby to provide flat parallel abutting surfaces utilizable for positioning one plate upon the other in superimposed relation preparatory to effecting a metal weld, as at 16, within the groove formed by said beveled edges 14. The plate edges are preferably beveled in order to reduce the amount of metal which the weld must penetrate to fuse the plates together.

After the plates 10 and 11 have been initially formed in a suitable die press, trimmed, rough ground and/or machined, they are preferably subjected to a suitable pickling bath, sand blast operation, heated in a controlled atmosphere, or otherwise treated to clean the inner plate surface and particularly the surface areas to be welded of all scale and the like as will be understood.

In accordance with the present invention, the plates 10 and 11 are placed in a portable jig or fixture in matched, contacting relation and so held therein by means of suitable clamps or the like forming a part of the fixture. The fixture is preferably of such character and design that, when said plates have been assembled and secured therein, the contacting edge areas of the plates and the shank ends thereof will be sufficiently exposed to facilitate the welding of said edge areas and also provide access to the interior chamber 12 formed by the said plates for a purpose hereinafter described. The special fixture above referred to has not been illustrated in the drawing since devices of this character are well known in ordinary shop practice.

Accordingly, assuming that the plates 10 and 11 are disposed and secured in a jig or fixture as aforesaid, paste-like material is introduced into the chamber 12 by way of the shank passage 17 and disposed at the weld line to form a backing. Examples of such paste-like material are the following: zirconium silicate combined, if desired, with silicate of soda as a binder and mixed with water; magnesite silica combined, if desired, with silicate of soda as a binder and mixed with water; or seven parts of an aluminium oxide refractory cement and one part of cuprous oxide mixed with water. Ordinarily, when the paste-like material is introduced into the chamber 12, the blade is so supported that the weld line faces vertically downward to thereby form a pocket in which the paste-like material is received. In Fig. 2, I have shown the weld backing material at 18 and it is to be noted that it is deposited to a suitable depth or thickness, for example, one-half of an inch at the weld line, along the inner meeting edges of the respective plates, the adhesion of the paste-like backing material causing it to adhere to the blade surfaces until additional filler material is introduced to back-up the paste-like material. To this end, the chamber 12 is completely filled with a fine granular, non-metallic material 19 such as dry foundry sand, for example, which is suitably tamped to hold the paste-like material in the position shown and to absorb some moisture therefrom, a suitable stopper or plug 20 thereafter being secured in the aforesaid passage 17 to retain the sand within said chamber 12. At this stage, the entire blade assembly is baked at a suitable temperature such, for example, as 450° F. to 600° F. to cast or transform the paste-like material into a hard, solid refractory weld backing, and, in this connection, the baking operation frees the backing material from moisture or other gas-forming substances. Thereafter, the contacting plate edges are secured together by the welded joint 16, for example, by atomic-hydrogen or submerged arc welding.

As previously stated, the plates 10 and 11 are so formed, machined and ground on their inner sides and particularly in the marginal edge regions thereof, preparatory to welding said plates together, that, when a pair of plates are placed in contacting facing relation, the interior surface in the region of the contacting faces 15 has a desired contour which, in most cases, should be maintained and which should not be disturbed by the welding operation. It is a feature of the invention that the refractory backing material 18 causes the aforesaid contour to be maintained during the welding operation.

By reason of the fact that the refractory backing 18 is hard and of heat-resisting character, it follows that, when the weld metal is deposited, complete weld penetration is insured while avoiding the possibility of burning and/or melting through. Thus, the backing 18 causes the interior plate surfaces, largely or entirely, to retain their original contour which is substantially parabolic transversely of the blade construction. This is highly desirable because avoiding the formation of a protruding irregular surface at the interior weld line.

After the plate members 10 and 11 have been thus welded together to form the propeller blade construction P as aforesaid, the shank plug 20, the sand filler 19 and the cast refractory material 18 are suitably removed from the interior of the blade and the exterior welded surface edges 16 suitably ground, finished and polished to complete a blade construction having a cross-section as illustrated in Fig. 3 of the drawing.

The mixing or fusing point of the refractory backing material 18 is preferably determined in the following manner. The melting point of said refractory backing material 18 should be above the welding temperature in those cases when it is desired that the welding operation shall effect no change in the contour of the inner plate surfaces. However, in case a slight change in the contour of the plate surfaces is required when, for example, the plates are close together as in the blade tip area or due to slight plate misalignment the melting point of the refractory backing material 18 should be approximately 100 degrees lower than that of the welding temperature in order to produce a slight surface melting of the refractory material. When this is done, the desired interior contour is obtained in response to the welding operation by deposition of weld metal.

In some cases, the surfaces of a pair of plate members, when disposed in welding position, may be out of alignment to some extent as illustrated in Fig. 4. If so, a suitable wax or wax-like material 21, initially, may be flowed or otherwise deposited on the mis-aligned surfaces to compensate for any off-set or unmatched edge condition whereby an uninterrupted interior surface is obtained. Thereupon, the paste-like material 18 is placed in the intended position and partakes of the contour which was rendered uniform by the wax deposit. After the paste-like material 18 has dried and set to some extent, the interior chamber 12 is filled with sand 19, the plug 20 inserted in the shank passage 17 and the composite structure subjected to a suitable baking temperature to bake or harden the refractory material.

As a result, the wax fillet 21 is melted but the space formerly occupied thereby is not filled by the material 18, this result being obtained by reason of the fact that said material 18 was allowed to dry or harden to some extent as noted above. Thereafter, as the welding operation is proceeded with, the plasticized metal conforms to the configuration of the refractory backing material, fills the space formerly occupied by the wax fillet 21 and forms a smooth surface having the desired contour at and on both sides of the inner edges of the plate edge faces 15 whereby an irregular internal weld seam is obviated.

After a blade construction P has thus been brought to a substantially finished condition as described, all of the twist is imparted thereto by a blow-up die, this operation including heating the blade to a suitable temperature, inserting the heated blade in the die and subjecting the blade, while in the die, to a suitable internal pressure of gas or air.

In Figs. 1, 2 and 3, I have illustrated backings 18 as disposed interiorly of the blade construction at the respective leading and trailing edges thereof. This procedure may be adopted or, if desirable or necessary, a backing 18 may be disposed at an edge only, the weld metal deposited at said edge whereupon a backing 18 may be disposed at the other edge and the weld metal deposited at this edge.

Although the invention has been described in connection with a propeller blade construction, it shall be understood, as hereinbefore stated, that the invention is susceptible of many other uses and applications.

While preferred embodiments of the invention have been described and illustrated, it is to be expressly understood that the same is not to be limited thereto since various changes and modifications may be made without departing from the spirit and scope of the invention and it is intended therefore in the appended claims to cover all such changes and modifications.

What is claimed as new and desired to be secured by Letters Patent, is:

1. In the art of producing a hollow propeller blade, the steps which consist in holding a pair of duplicate blade-forming plates together in facing relation, depositing a temporary fillet-forming material between said plates along the underside of the leading and trailing edges thereof, coating said temporary fillet with a substantial layer of paste-like material, completely packing said blade with a granular non-metallic material, plugging the shank end of said blade, subjecting said blade to temperature sufficiently high to bake said paste-like material to form a refractory substance while removing said temporary fillet, welding said plates together along the exterior marginal edges thereof, and subsequently withdrawing said refractory and granular material.

2. In the attachment of metal elements by welding to provide an integral article, the steps which consist in holding the elements in the position relative to one another which they are intended to finally occupy, applying to said elements in the zone of the intended weld, moldable material fusible at a temperature substantially less than welding temperature, conforming said moldable material to the final form of the article in the zone of the weld, coating the elements and moldable material in the region of the intended weld with a formable refractory thermal setting composition, heating the assembly of elements, moldable material and composition to a temperature high enough to set the composition and to fuse the moldable material so that it may drain from the assembly to leave a void in place thereof, heating and applying weld material to the elements to fill said void and to join said elements, and then removing said refractory composition after freezing of the weld metal.

ARTHUR W. STEINBERGER.

REFERENCES CITED

The following references are of record in the file of this patent:

UNITED STATES PATENTS

| Number | Name | Date |
|---|---|---|
| 175,850 | Brainard | Apr. 11, 1876 |
| 1,775,576 | Waters | Sept. 9, 1930 |
| 1,902,051 | Wall | Mar. 21, 1933 |
| 1,990,077 | Kershaw | Feb. 5, 1935 |
| 2,145,009 | Kier | Jan. 24, 1939 |
| 2,173,109 | Hamblin | Sept. 19, 1939 |
| 2,306,177 | Mattson | Dec. 22, 1942 |
| 2,326,430 | Blanchard | Aug. 10, 1943 |
| 2,331,689 | Hodge | Oct. 12, 1943 |
| 2,331,937 | Schreiner | Oct. 19, 1943 |
| 2,362,505 | Smith | Nov. 14, 1944 |
| 2,362,507 | Steinbock | Nov. 14, 1944 |
| 2,365,228 | Stout | Dec. 19, 1944 |
| 2,431,064 | McKee | Nov. 18, 1947 |

FOREIGN PATENTS

| Number | Country | Date |
|---|---|---|
| 11,286 | Great Britain | Apr. 27, 1943 |
| 346,960 | Germany | Oct. 7, 1920 |

OTHER REFERENCES

A. P. C. Application of Zellbeck, Ser. No. 314,204, Published Apr. 27, 1943.